United States Patent [19]
Sakatani et al.

[11] Patent Number: 5,551,170
[45] Date of Patent: Sep. 3, 1996

[54] REFUSE TREATING APPARATUS

[75] Inventors: Hideaki Sakatani, Takarazuka; Hirofumi Nishida, Osaka; Yoji Uetani, Amagasaki; Yoichi Kuroki, Kawachinagano; Keiko Hata, Amagasaki; Tatsuo Fujita, Osaka; Tatsuo Kikawa, Oumihachiman; Seichi Ueno, Hikone; Yukio Hayashida, Amagasaki, all of Japan

[73] Assignee: Matsushita Electric Industrial Co., Ltd., Osaka, Japan

[21] Appl. No.: 225,903

[22] Filed: Apr. 11, 1994

[30] Foreign Application Priority Data

Apr. 12, 1993 [JP] Japan .................................. 5-084255
Jul. 30, 1993 [JP] Japan .................................. 5-189670

[51] Int. Cl.$^6$ ......................................................... F26B 19/00
[52] U.S. Cl. .................................. 34/549; 34/543; 34/554
[58] Field of Search .......................... 34/549, 553, 554, 34/555, 535, 543, 546, 497

[56] References Cited

U.S. PATENT DOCUMENTS

| 2,445,516 | 7/1948 | Dickey | 34/543 |
| 3,327,404 | 6/1967 | Ganier | 34/554 |
| 3,678,597 | 7/1972 | Stuhlmann et al. | 34/554 |
| 3,982,052 | 9/1976 | Bearce | 34/554 |
| 5,433,019 | 7/1995 | Fu et al. | 34/535 |

FOREIGN PATENT DOCUMENTS

| 0165578 | 12/1985 | European Pat. Off. . |
| 5024601 | 2/1993 | Japan . |
| WO91/16134 | 10/1991 | WIPO . |

*Primary Examiner*—John T. Kwon
*Attorney, Agent, or Firm*—McDermott, Will & Emery

[57] ABSTRACT

Refuse 21 in a refuse container 2 is heated by a heater 16, and the steam generated from the refuse 21 is condensed by a condenser 8. The ambient temperature near the refuse container 2 is detected by a first temperature detector 6, and the output of the heater 16 is controlled by the output of the first temperature detector 6 so that the temperature near the refuse container 2 may be a specific temperature, and the temperature of the steam flowing out from the refuse container 2 into the condenser 8 is detected by a second temperature detector 7 at the condenser 8. When the temperature change of the second temperature detector 7 exceeds a specific value, the drying process is terminated, so that the drying end time can be detected accurately without allowing to scorch.

8 Claims, 20 Drawing Sheets

REFUSE TREATING APPARATUS

FIELD OF THE INVENTION

The present invention relates to a refuse treating apparatus for treating refuse, mainly domestic kitchen waste.

BACKGROUND OF THE INVENTION

Hitherto, the refuse treating apparatus is classified into the combustion heat method, microwave method and electric heater method, by the type of heating source. The refuse treating apparatus of combustion heat method employs gas fuel or liquid fuel, and the entire apparatus is large and complicated, and involves a safety problem. The refuse treating apparatus of microwave method is suited to drying process of moist waste because the microwaves are selectively adsorbed in the moisture in the waste, but is slightly inferior in safety and controllability. As compared with them, the refuse treating apparatus of electric heater method is excellent in safety and controllability, and is small in size, and hence the cost can be reduced.

However, in the conventional refuse treating apparatus employing electric heaters, when heating the refuse by the heater, in order to generate steam from the refuse, the heater surrounding temperature must be set over 100° C. to obtain overheated steam, and when continued to heat in this state, if drying is over, the temperature change is small (nearly same as the heater set temperature), and it is hard to detect the drying end time. If the drying end time is not detected accurately, drying time becomes longer, and the heating cost is wasteful, or the refuse is scorched, which is not sanitary.

SUMMARY OF THE INVENTION

It is hence a first object of the invention to detect the drying end time accurately even by using an electric heater as heating means.

It is a second object to prevent malfunction by detecting the drying end time accurately if the degree of steam generation changes due to changes in the state of use of the refuse treating apparatus or ambient temperature, or if changing more than a specific value from the maximum value during drying process.

It is a third object to keep the refuse in dry state so as not to rot, by adding hot air efficiently to the refuse, increasing the steam generation output, forming a structurally stable passage of steam, stabilizing detection of steam temperature, and detecting the drying end time accurately.

It is a fourth object to dry efficiently without abnormally heating the refuse, by directly and exactly observing the state of progress of drying of refuse.

To achieve the first object, the invention presents a refuse treating apparatus comprising a refuse container, heating means for heating the refuse in the refuse container, a condenser for condensing the steam generated from the refuse, first temperature detecting means for detecting the ambient temperature near the refuse container, and second temperature detecting means for detecting the temperature of the steam flowing out from the refuse container into the condenser at the condenser, wherein the output of the heating means is controlled by the first temperature detecting means so that the ambient temperature near the refuse container may be a specific or predetermined temperature, and the drying process is terminated when the temperature change the second temperature detecting means exceeds a specific or predetermined value.

In this constitution, when the heating means is operated after charging the refuse into the refuse container, the air around the heated heating means begins to heat the refuse. The refuse temperature goes up, and soon the refuse is dried while generating steam. In order that the temperature in the refuse container may be a specific temperature, the heating means output is controlled by the first temperature detecting means, and drying process is continued while preventing scorching of refuse. As approaching the drying end time, the steam volume decreases, and the temperature of the outer wall of the condenser drops. Therefore, when the temperature change of the second temperature detecting means provided on the outer wall of the condenser exceeds a specific value, the drying process is terminated, so that the drying end time can be detected accurately without allowing to scorch.

The dried refuse remains in the refuse container, but the bulk is decreased and the moisture activity is lowered by drying, and therefore it is free from rot or mold if left over in the refuse container. Therefore, until the refuse container is filled up, fresh refuse can be successively put on the dried refuse and dried.

To achieve the second object, the drying process is terminated when the temperature of the condenser is lowered by a specific value from the maximum value, and continuously in a specific time, during drying process.

In this constitution, as the refuse in the refuse container nears the drying end time, the steam volume decreases, and the temperature of the outer wall of the condenser declines. By terminating the drying process when the temperature change of the second temperature detecting means provided ill the condenser continues to exceed a specific value for a specific time, the drying end time is detected accurately, without causing scorch or without terminating earlier by mistake in the midst of drying process.

To achieve the third object, a steam passage for the steam flowing out from the refuse container to the condenser is provided near the second temperature detecting means for detecting the temperature of the steam flowing out from the refuse container to the condenser at the condenser.

In this constitution, the second temperature detecting means is more sensible to the heat of the steam, and the temperature change can be detected more accurately. Therefore, by terminating the drying process when the temperature change of the second temperature detecting means provided on the outer wall of the condenser exceeds a specific value, the drying end time can be detected accurately without allowing to scorch.

To achieve the fourth embodiment, third temperature detecting means for detecting the refuse temperature is attached to the lower outer wall of the refuse container, and the drying process is terminated when the change of temperature detected by the third temperature detecting means exceeds a specific value.

In this constitution, the progress of refuse drying is directly and accurately detected, and drying process is carried out efficiently without abnormally heating the refuse.

DESCRIPTION OF THE PREFERRED EMBODIMENTS

Figure 1:
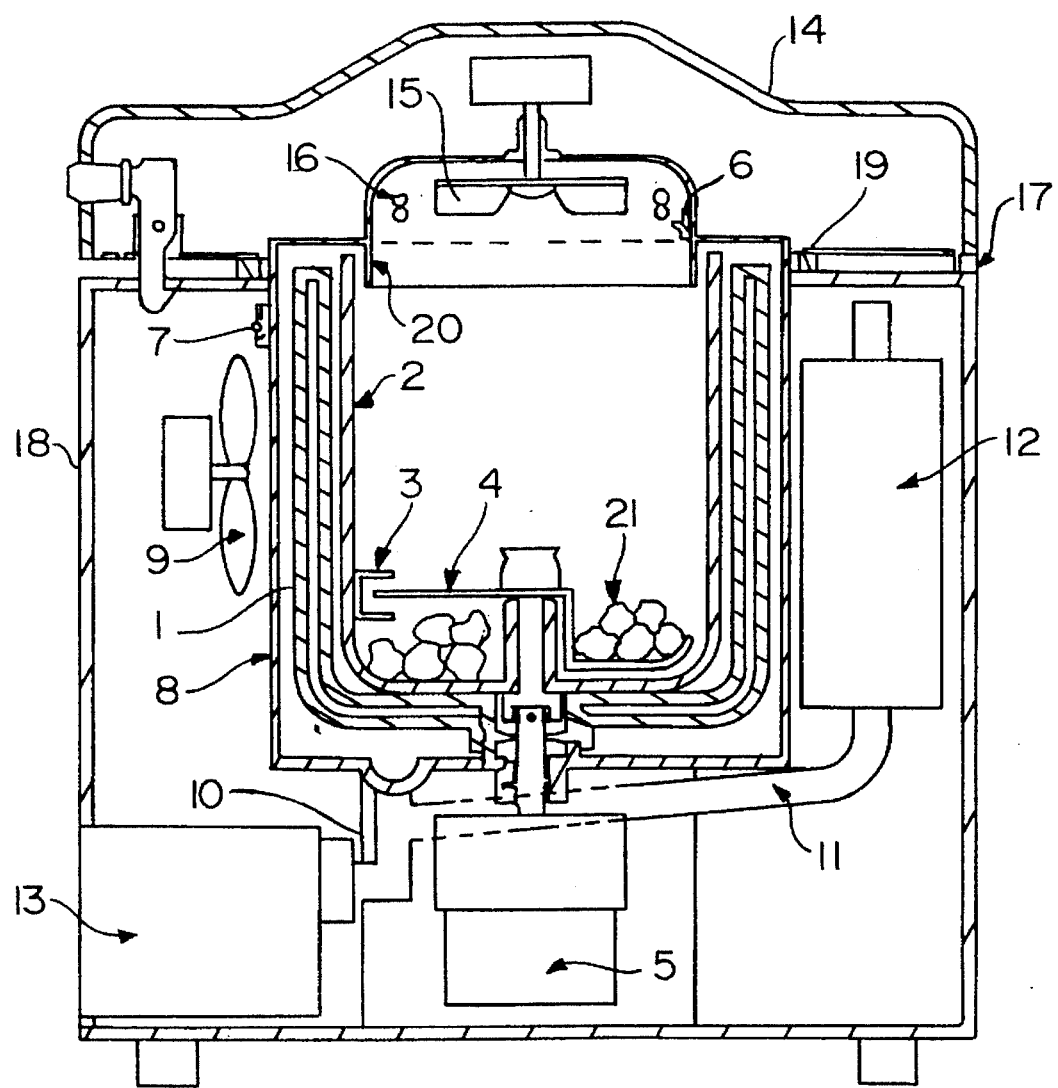
FIG. 1 is a sectional view of a refuse treating apparatus in a first embodiment of the invention.

Referring now to FIG. 1, the first embodiment of the invention is described below.

As shown in the drawing, an insulated container 1 has a refuse container 2 installed detachably inside, and a stationary blade 3 is provided in the inner wall of the refuse container 2. A rotary blade 4 is linked to a rotary shaft motor 5. A first temperature detector (first temperature detecting means) 6 is positioned near the refuse container 2 so as to detect the ambient temperature in the refuse container 2. A second temperature detector (second temperature detecting means) 7 is installed on the outer wall of a condenser 8 in order to detect the temperature of the steam flowing out from the refuse container 2 into the condenser 8.

On the outer circumference of the insulated container 1, the condenser 8 and a cooling fan 9 for air cooling the outer surface of the condenser 8 are installed. In the lower part of the condenser 8, an condensate flow-out unit 10 is provided, and a catalytic device 12 is connected to a gas exhaust pipe 11 for discharging the gas (containing odor) generated from the refuse 21 from part of the condensate flow-out unit 10. At the lower side of the condensate flow-out unit 10, a condensate container 13 is provided. Above the condenser 8, a lid 14 is provided, an agitation fan 15 and a heater 16 are installed as heating means in the lid 14.

The lid 14 is opened and closed by a hinge 17 to cover a refuse treating apparatus main body 18, and the lid 14 is also provided with a lid packing 19 in order to prevent leak of steam generated from the refuse 21. A certain gap is provided among the insulated container 1, the upper end of the refuse container 2, and the lower surface of the lid 14, and a passage of steam generated from the refuse 21 is formed. A hood 20 prevents the hot air by the agitation fan 15 and heater 16 from escaping by a short cut through the gap between the refuse container 2 and lid 14, and guides the hot air to be supplied effectively to the refuse 21.

Explaining the operation in this constitution, the refuse 21 put into the refuse container 2 is stirred by the rotary blade 4 and ground by the rotary blade 4 and stationary blade 3. The hot air by the agitation fan 15 and heater 16 circulates in the space formed by the lower surface of the lid 14, hood 20 and the refuse container 2, and the refuse 21 is heated while stirring the air in this space. The output of the heater 16 is controlled by the output of the first temperature detector 6 so that the ambient temperature in the refuse container 2 may be a specified temperature, and the drying process is continued while preventing scorching of the refuse 21.

Steam is generated from the heated refuse 21, and flows out into the condenser 8. By the function of the insulated container 1, the temperature of the condenser 8 is lower than inside the refuse container 2, and therefore the steam is condensed, and the condensate is collected in the condensate container 13. As approaching the end of drying, the generation of steam decreases, and the temperature of the second temperature detector 7 provided on the outer wall side of the condenser 8 changes (declines). Therefore, by terminating the drying process when the temperature change of the second temperature detector 7 exceeds a specified value, the drying end time can be known accurately without allowing the refuse 21 to scorch.

Thus, according to the embodiment, the drying process is continued by controlling the output of the heater 16 so that the ambient temperature in the refuse container 2 may reach the specified temperature by the first temperature detector 6, and the steam generation decreases as approaching the end of drying, and hence the temperature of the outer wall of the condenser 8 drops, and the drying process is terminated when the temperature change of the second temperature detector 7 following it exceeds the specified value, so that end of drying is known accurately without causing scorching.

Figure 2:
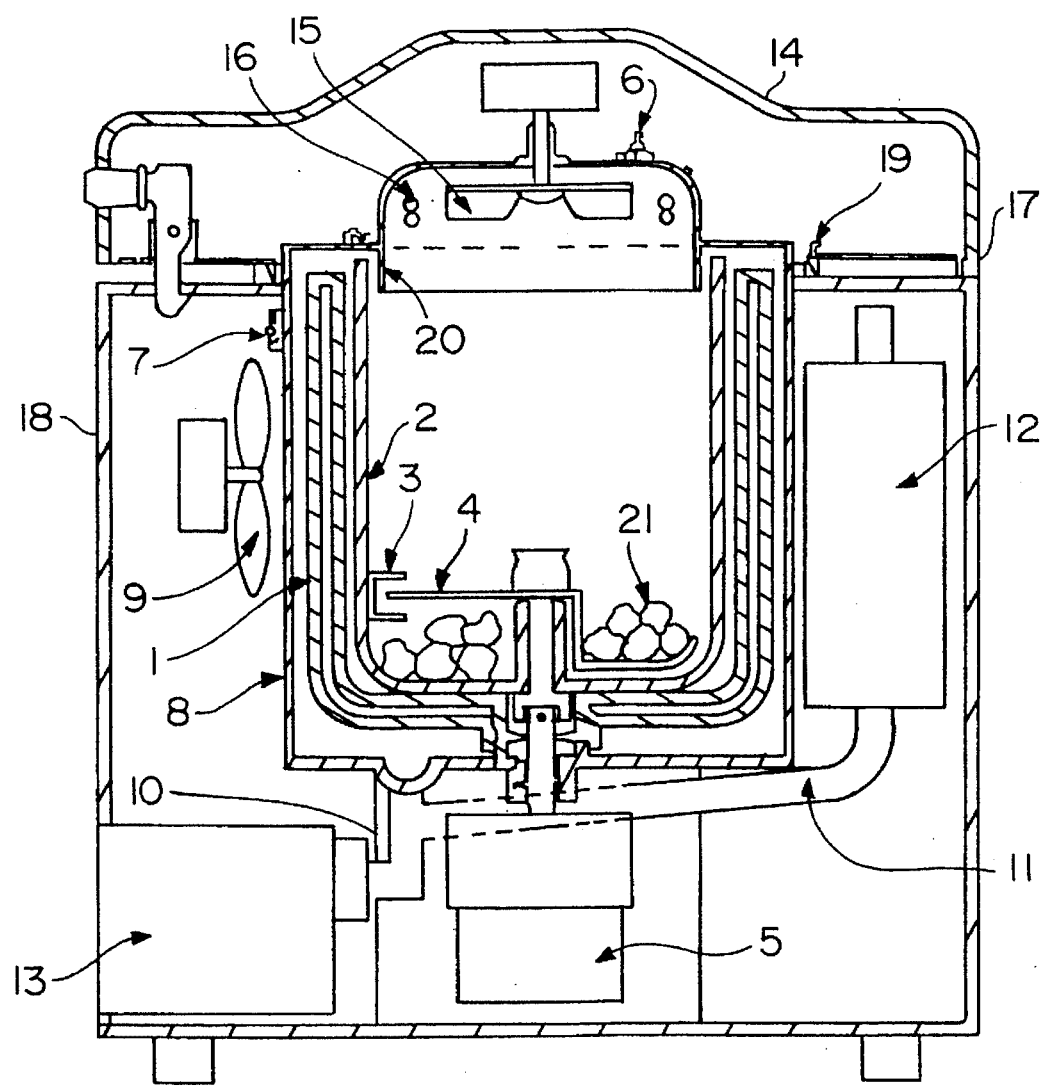
FIG. 2 is a sectional view of a refuse treating apparatus in a second embodiment of the invention.

The second embodiment of the invention is described below by reference to FIG. 2. Same parts as in the first embodiment are identified with same reference numerals and their explanations are omitted.

As shown in the drawing, the first temperature detector 6 is positioned on the metal hood 20 installed in the lid 14 provided above the refuse container 2 so as to detect the ambient temperature in the refuse container 2.

Explaining the operation in this constitution, by the output of the first temperature detector 6, the output of the heater 16 is controlled so that the ambient temperature in the refuse container 2 may be a specified value, and same as in the first embodiment, the drying process can be continued while preventing scorching of the refuse 21. Besides, since the first temperature detector 6 is installed on the hood 20, the precision of temperature detection in the refuse container 2 is high, and since it is not exposed to steam, a thermistor can be used for the temperature detector 6.

The third embodiment of the invention is described below.

In the constitution of the first embodiment, the drying process is terminated when the temperature of the outer wall of the condenser 8 in the drying process is lowered by a specific amount from the maximum value. The other constitution is same as in the first embodiment.

Figure 3:
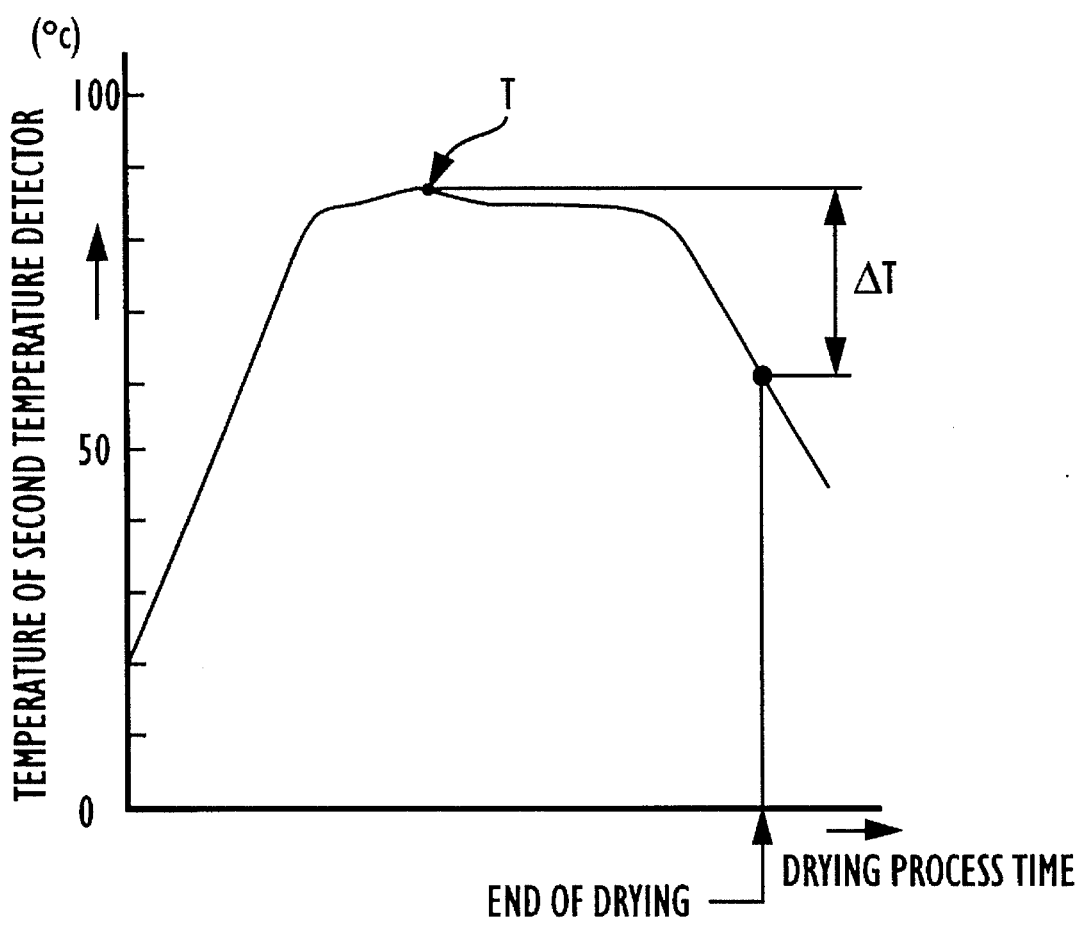
FIG. 3 is a diagram showing the drying end detection of a refuse treating apparatus in a third embodiment of the invention.

In this constitution, explaining the operation by reference to FIG. 3, upon start of drying, by the steam generated from the heated refuse 21, the temperature of the second temperature detector 7 rises, and saturates near 100° C. Afterwards, the temperature of the second temperature detector 7 maintains around 100° C. As nearing the end of drying, the steam generation from the refuse 21 decreases, and the temperature of the second temperature detector 7 provided on the outer wall side of the condenser 8 declines. Therefore, by monitoring the temperature change of the second temperature detector 7, when the temperature of the second temperature detector 7 is lowered by a specified amount $\Delta T$ from the maximum value T, the drying process is terminated. As a result, the drying end time can be known accurately without allowing to scorch.

According to the embodiment, in this way, since the drying process is terminated when the temperature of the second temperature detector 7 provided the outer wall of the condenser 8 is lowered by the specified amount from the maximum value in the midst of drying, the end of drying process is detected by one temperature detector, and hence it is stable with less error and the cost can be cut.

The fourth embodiment of the invention is described below.

In the constitution or the first embodiment, the drying process is terminated when the temperature of the outer wall of the condenser 8 reaches a specific value, by correcting the effects of ambient temperature, in the midst of drying process. The other constitution is same as in the first embodiment.

Figure 4:
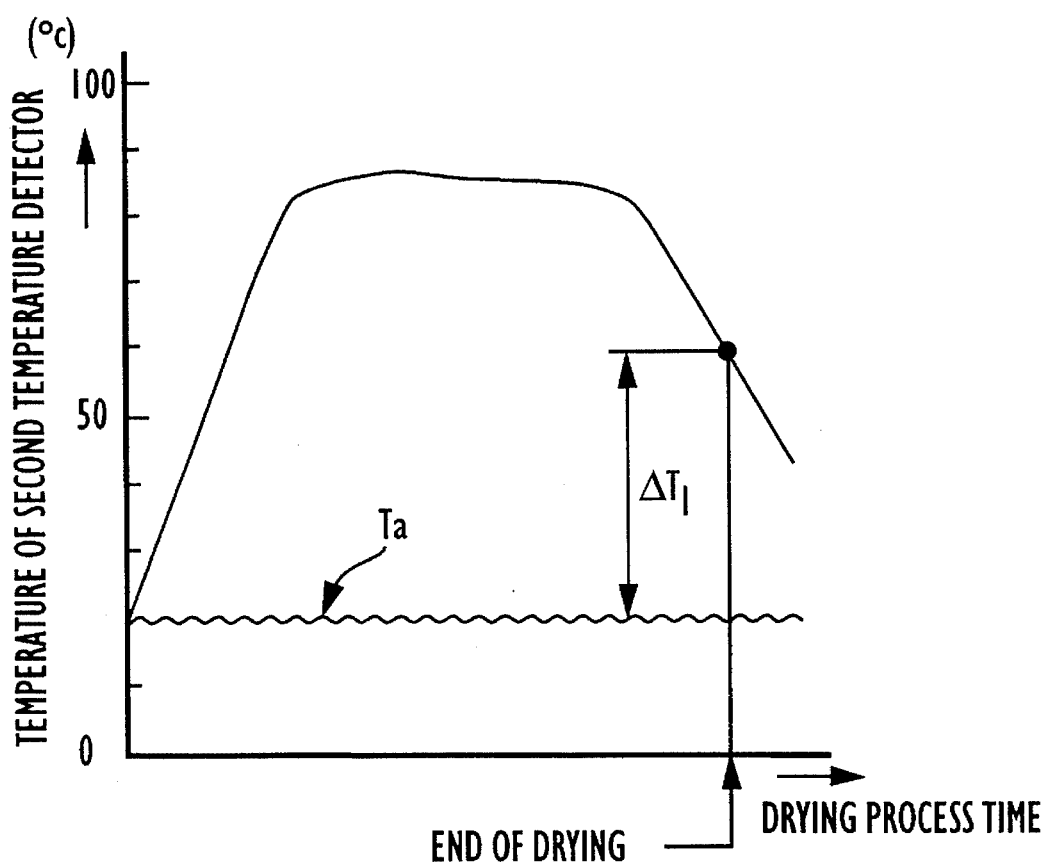
FIG. 4 is a diagram showing the drying end detection of a refuse treating apparatus in a fourth embodiment of the invention.

In this constitution, the operation is described while referring to FIG. 4. Upon start of drying, by the steam generated from the heated refuse 21, the temperature of the second temperature detector 7 rises, and saturates near 100° C. Afterwards, the temperature of the second temperature detector 7 maintains around 100° C. As nearing the end of drying, the steam generation from the refuse 21 decreases, and the temperature of the second temperature detector 7 provided on the outer wall side of the condenser 8 declines. Therefore, by monitoring the temperature change of the second temperature detector 7, when the temperature of the second temperature detector 7 reaches a specified value T1 by correcting the effects of ambient temperature Ta, the drying process is terminated. As a result, the drying end time can be known stably without effects of changes of ambient temperature.

Thus, according to the embodiment, since the drying process is terminated when the temperature of the second temperature detector 7 provided on the outer wall side of the condenser 8 reaches the specified value by correcting the effects of ambient temperature, the end of drying can be detected stably without effects of changes of ambient temperature.

The fifth embodiment of the invention is described below.

In the constitution of the first embodiment, when the temperature of the outer wall of the condenser 8 continues to maintain below a specific value for a specific time in the drying process, it is judged that the refuse container 2 is empty, thereby terminating the drying process. The other constitution is same as in the first embodiment.

Figure 5:
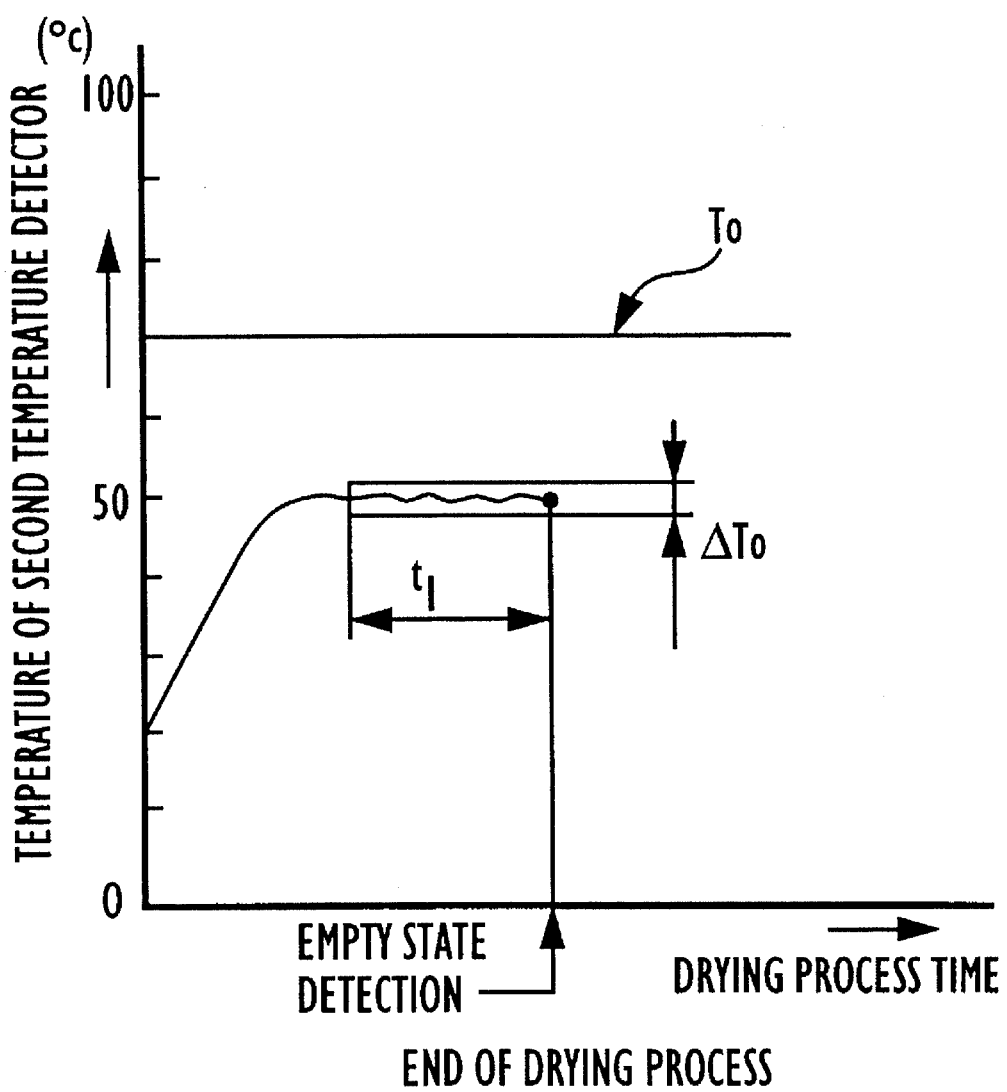
FIG. 5 is a diagram showing the drying end detection of a refuse treating apparatus in a fifth embodiment of the invention.

Explaining the operation of the constitution while referring to FIG. 5, upon start of drying, by the steam generated from the heated refuse 21, the temperature of the second temperature detector 7 goes up. At this time, when the temperature of the second temperature detector 7 is below a specific temperature T0, and within a range of $\Delta$T0 for a specific time t1, it is judged that the refuse container 2 is empty, and drying process is terminated. Thereby, empty drying can be prevented.

Thus, according to the embodiment, the empty state in the refuse container 2 is detected by the output of the second temperature detector 7 provided on the outer wall of the condenser 8, and the drying process is terminated, and empty drying can be prevented, so that extra electric power can be saved.

The sixth embodiment of the invention is described below.

In the constitution of the first embodiment, after start of temperature detection by the second temperature detector 7, while always updating the maximum temperature, when the temperature is lowered by more than a set temperature from the maximum temperature, power supply to the heater 16 is stopped. The other constitution is same as in the first embodiment.

In this constitution, when the ambient temperature changes temporarily during drying process, even in the midst of drying, the temperature of the second temperature detector 7 is temporarily lowered from the ambient temperature, and it is judged incorrectly that drying is over, but by stopping power feed to the heater 16 when the temperature is lowered by more than a set value from the maximum temperature while always updating the maximum temperature, it is free from effects of temporary changes of ambient temperature.

Thus, according to the embodiment, after start of temperature detection by the second temperature detector 7, while always updating the maximum temperature, the power supply to the heater 16 is stopped only the temperature is lowered by more than the set temperature from the maximum temperature, malfunction does not occur even if the ambient temperature changes, and the drying process can be terminated precisely.

The seventh embodiment of the invention is described below.

In the constitution of the first embodiment, the temperature of the condenser 8 in the drying process is measured at the same timing as the on/off period of the rotary blade 4. The other constitution is same as in the first embodiment.

Figure 6A:
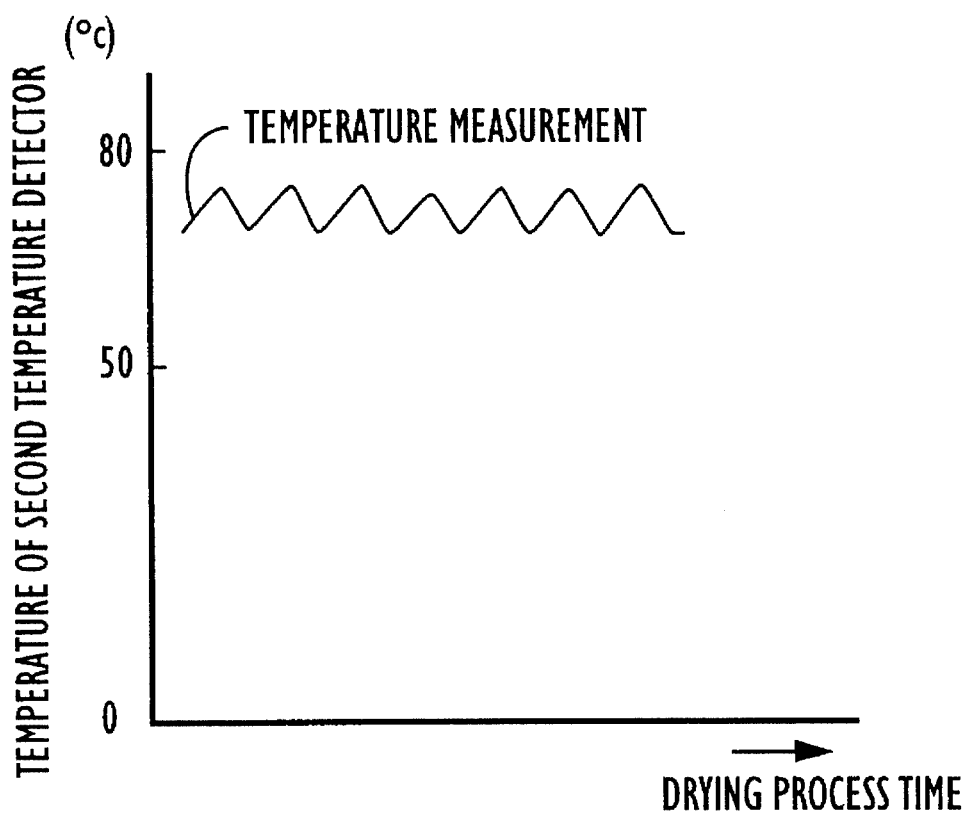
FIGS. 6 (a), 6 (b) are timing charts of temperature measurement of a refuse treating apparatus in a seventh embodiment of the invention.
Figure 6B:
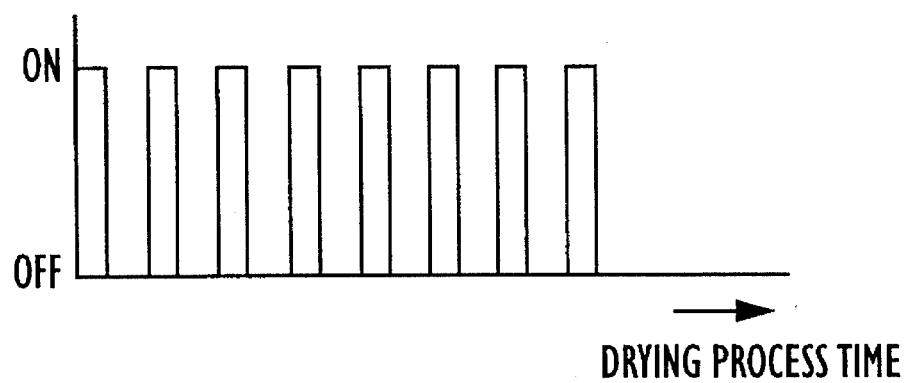

In the constitution, explaining the operation by referring to FIG. 6 (a), (b), which are magnified views of temperature of second temperature detector 7 in coincidence with on/off of the rotary blade 4, and the temperature of the second temperature detector 7 is varied as shown in FIG. 6 (a) in coincidence with on/off the the rotary blade 4 as shown in FIG. 6 (b). That is, when the rotary blade 4 is off, the steam generation is increased, and when it is on, the steam generation decreases due to agitation with the cold refuse 21, so that the temperature detected by the second temperature detector 1 varies. Therefore, by measuring the temperature of the outer wall of the condenser 8 in drying process at the same timing as the on/off period of the rotary blade 4, effects of temperature changes of the second temperature detector 7 due to on/off of rotary blade 4 can be ignored. In the embodiment, the off case of rotary blade 4 is explained, but it is the same in the on case.

Figure 7:
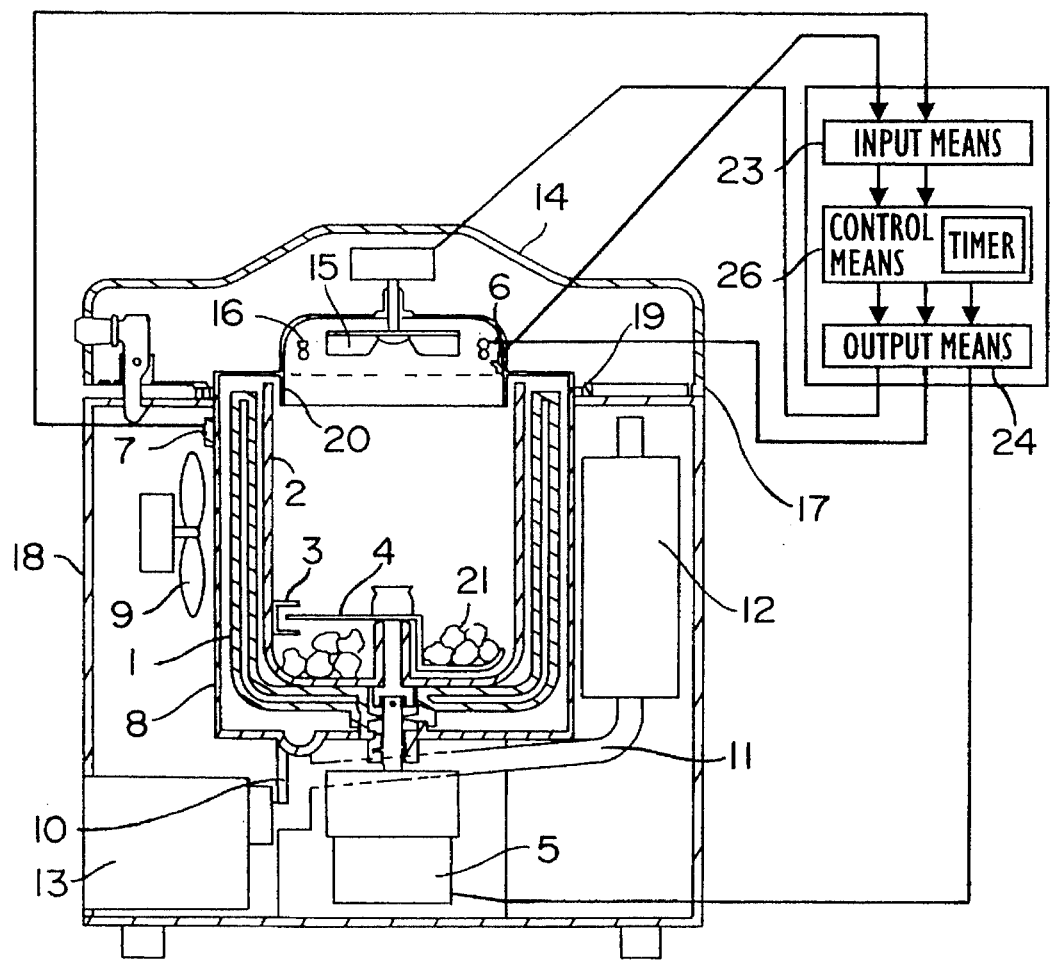
FIG. 7 is a system configuration diagram of a refuse treating apparatus in an eighth embodiment of the invention.

The eighth embodiment of the invention is described below while referring to FIG. 7. The same parts as in the first embodiment are identified with same reference numerals and the explanations are omitted.

As shown in the drawing, control means 22 possesses a timer function inside, the output of the first temperature detector 6 and the output of the second temperature detector 7 are fed through input means 23, and the output of the motor 16 is controlled through output means 24, and the drying process is carried out while controlling the agitation fan 15 and cooling fan 9, and the drying is terminated when the temperature change of the second temperature detector 7 continues to be over the specified amount from the maximum value in the drying process longer than the specified time.

In this constitution, the operation is described below while referring to FIG. 8 and FIG. 9.

Figure 8:
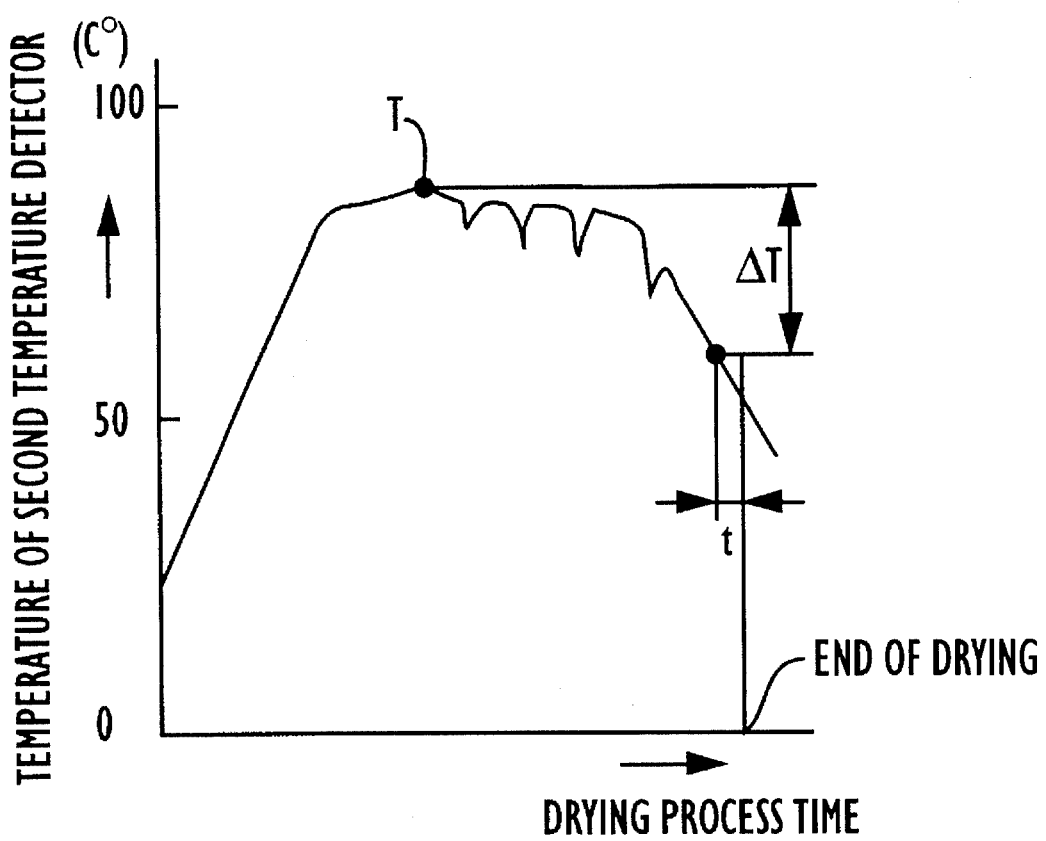
FIG. 8 is a diagram showing the drying detection of the refuse treating apparatus.
Figure 9:
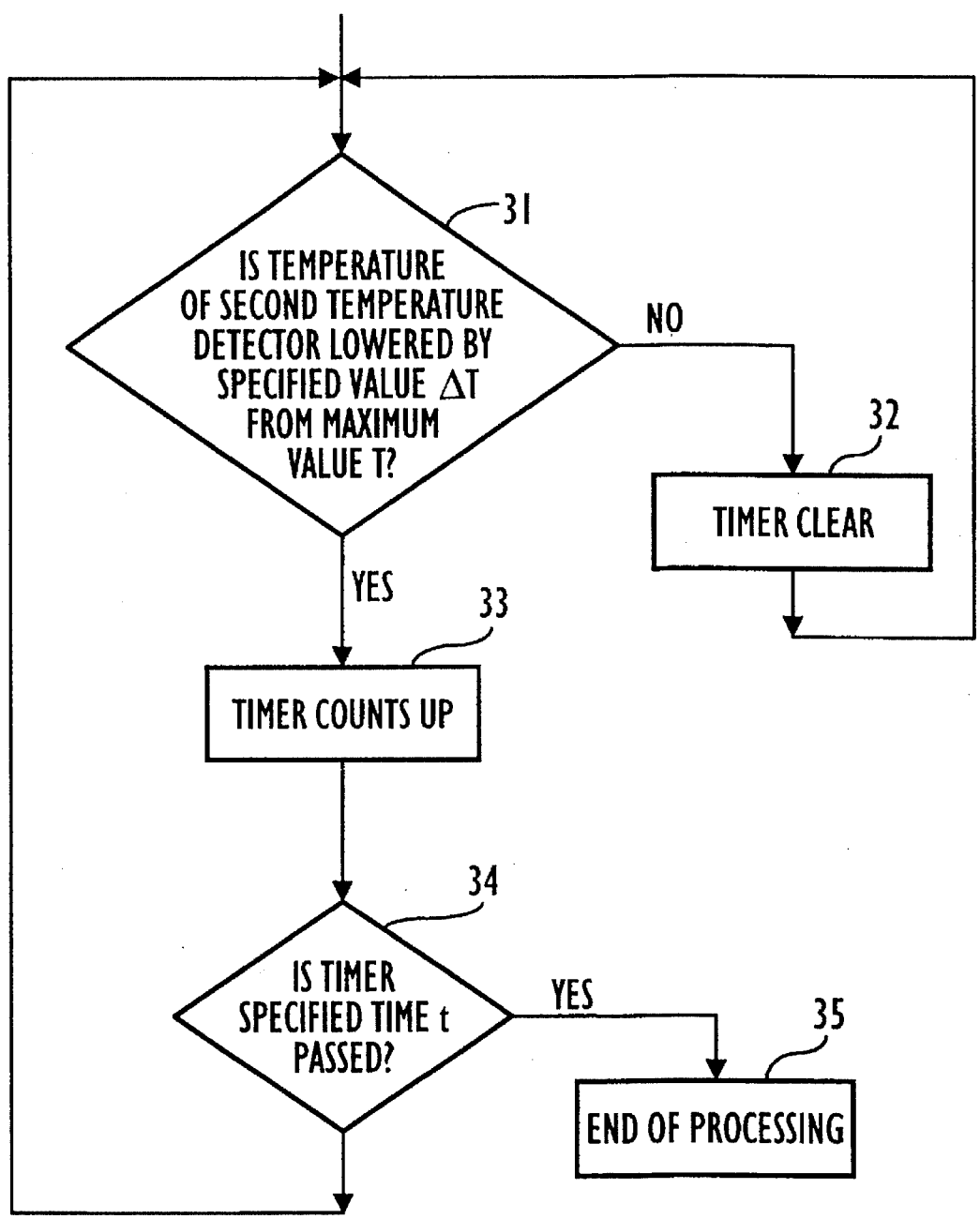
FIG. 9 is an operation flow chart of essential parts of the refuse treating apparatus.

As shown in FIG. 8, upon start of heating, the temperature of the second temperature detector 7 is raised by the steam generated from the heated refuse 21, and is saturated near 100° C. Afterwards, the temperature of the second temperature detector 7 remains near 100° C. As nearing the end of drying, the steam generation from the refuse 21 decreases, and the temperature the second temperature detector 7 mounted on the outer wall side of the condenser 8 declines. Consequently, the control means 22 monitors the temperature change of the second temperature detector 7 at step 31 as shown in FIG. 9, and the internal timer is cleared at step 32 until reaching the specified value to return to step 31. When the temperature of the second temperature detector 7 is lowered by the specified amount ΔT from the maximum value T, advancing to step 33, the timer counts, and when the specified time is passed at step 34, advancing to step 35, the drying process is terminated. In this way, without error in detecting the end due to temperature change during drying process, the drying end time can be detected accurately, without allowing to scorch.

Thus, according to the embodiment, without ending earlier due to temperature changes during drying process, the specified amount may be smaller, and scorching may be prevented. By setting the specified time longer than the temperature change time during drying process, earlier ending of drying process can be securely inhibited.

In the embodiment, meanwhile, the first temperature detector 6 is used for temperature adjustment of the heater 16, but the temperature of the heater 16 may be controlled constant by using temperature regulator such as bimetal without using first temperature detector 6.

Figure 10:
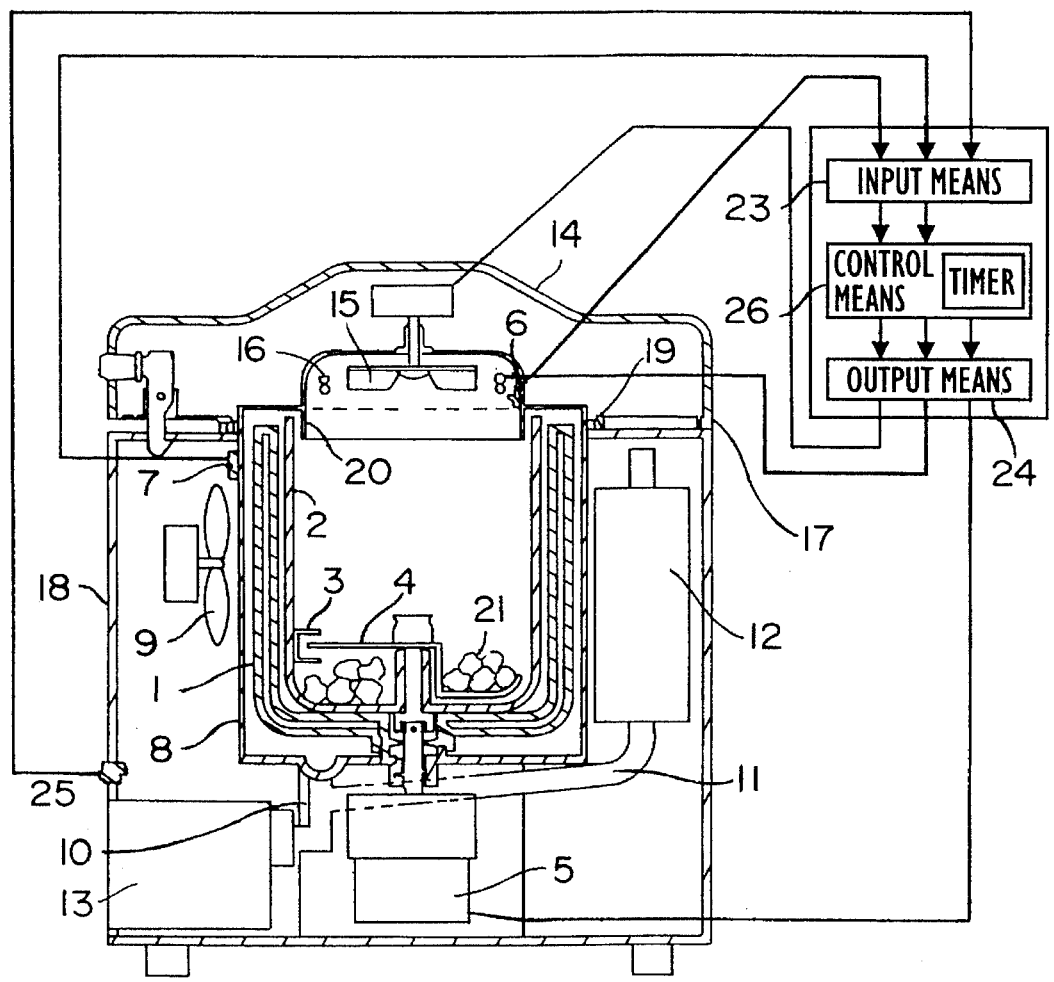
FIG. 10 is a system configuration diagram of a refuse treating apparatus in a ninth embodiment or the invention.

The ninth embodiment of the invention is described below while referring to FIG. 10. The same parts as in the eighth embodiment are identified with same reference numerals and their explanations are omitted.

As shown in the drawing, ambient temperature measuring means 25 is mounted on the refuse treating apparatus main body 18 for measuring the ambient temperature, and its output is fed into control means 26. The control means 26 set the specified temperature for judging the empty state which is determined by the ambient temperature as the temperature of the condenser 8 in the drying process, and when the temperature of the condenser 8 continues to be below the specified temperature for more than a specified time, the refuse container 2 is judged to be empty, and drying process is terminated.

Figure 11:
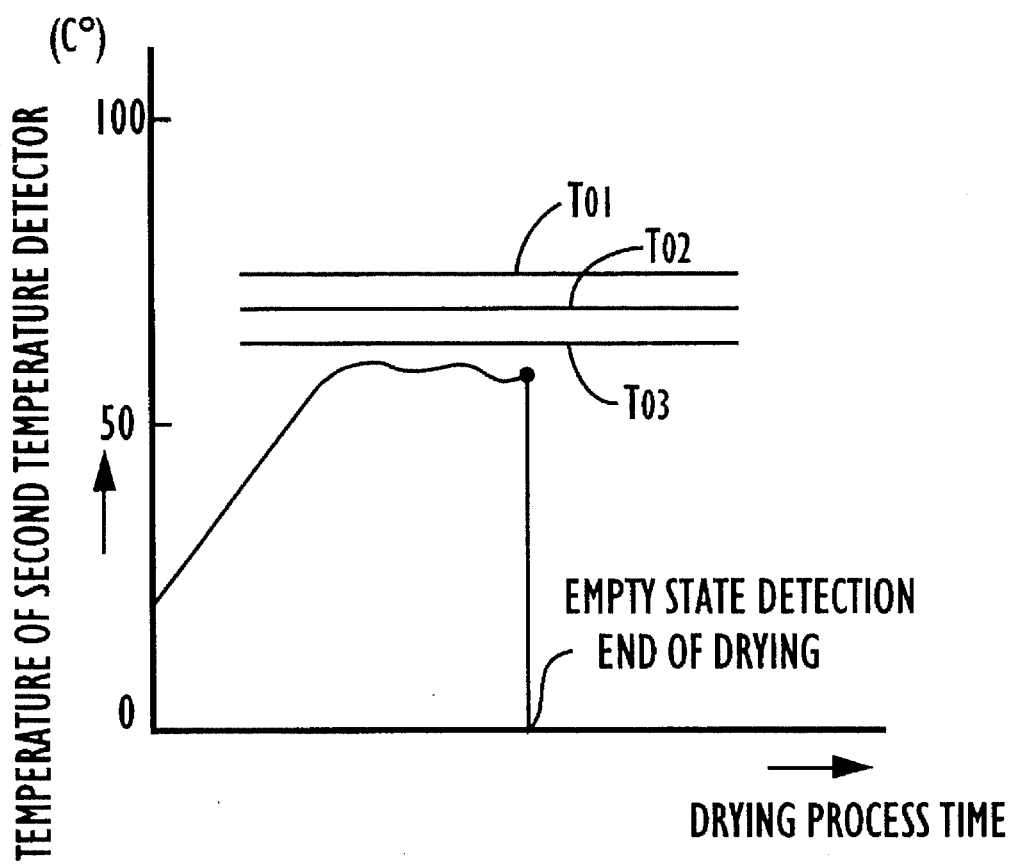
FIG. 11 is a diagram showing a blank detection of the refuse treating apparatus.

In this constitution, explaining the operation while referring to FIG. 11, the specified temperature T01 for judging the empty state in the refuse container 2 is 75° C. when the ambient temperature is 40° C., the specified temperature T02 is 70° C. when the ambient temperature is 20° C., and the specified temperature T03 is 65° C. when the ambient temperature is 0° C. When the temperature of the outer wall of the condenser 8 during the drying process is the specified temperature determined by the ambient temperature, for example, when the ambient temperature is 0° C., upon maintaining below the specified temperature T03 for specified time, the refuse container 2 is judged to be empty, and the drying process is terminated.

In this way, according to the embodiment, when the temperature of the condenser 8 in the drying process maintains below the specified temperature determined by the ambient temperature for the specified time, the refuse container 2 is judged to be empty, and the drying process is terminated, so that the effects of ambient temperature can be ignored.

The tenth embodiment of the invention is described below.

The control means 26 in FIG. 8 controls the temperature measurement of the condenser 8 in the drying process to be effected in every timing same as the on/off period of the rotary blade 4. The other constitution is the same as in the eighth embodiment.

Figure 12A:
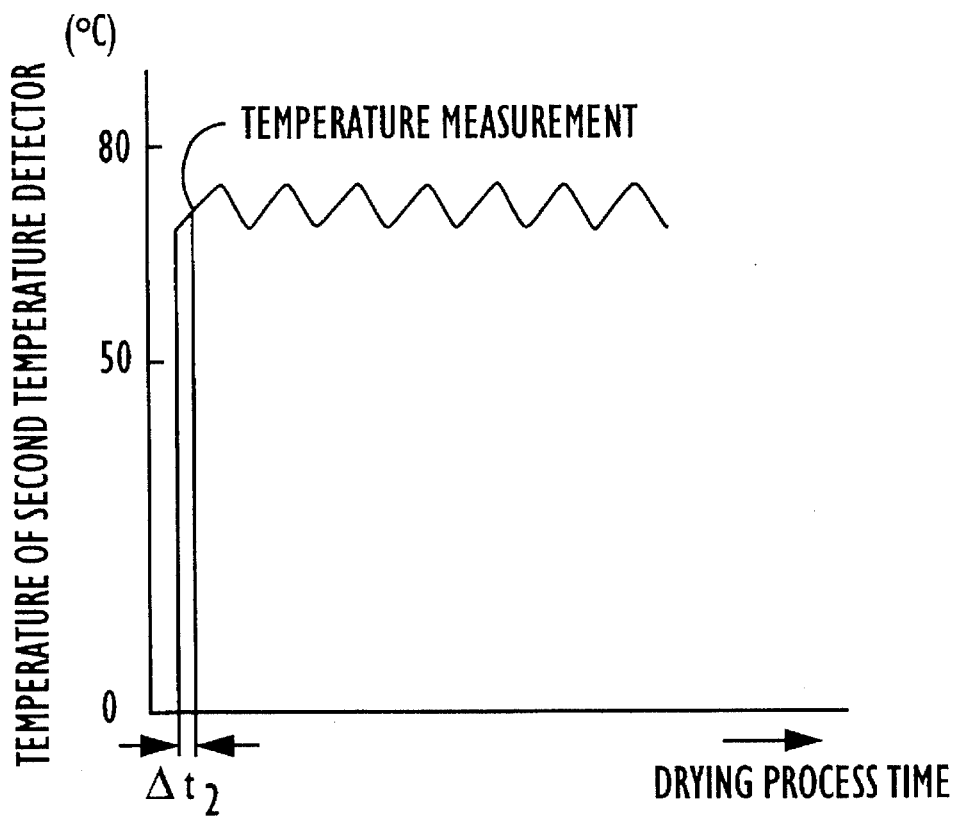
FIGS. 12 (a), 12 (b) are timing charts of temperature measurement of a refuse treating apparatus in a tenth embodiment of the invention.
Figure 12B:
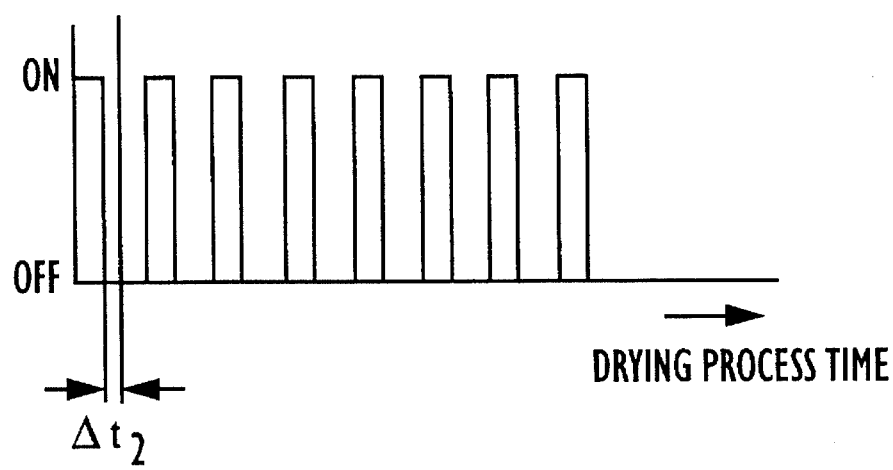

In this constitution, explaining the operation while referring to FIGS. 12 (a), (b), which are magnified views of the temperature of the second temperature detector 7 matched with on/off of the rotary blade 4, and by matching with on/off of the rotary blade 4 shown in FIG. 12 (b), the temperature of the second temperature detector 7 varies as shown in FIG. 12 (a). That is, when the rotary blade 4 is off, the steam generation increases, and when it is on, the steam generation is decreased due to agitation with the cold refuse 21, thereby varying the temperature of the second temperature detector 7. The control means controls to measure the temperature of the second temperature detector 7 in the delay of temperature measurement of outer wall of the condenser 8 in the drying process by time Δt2 (several milliseconds) after the rotary blade 4 is off, so that the effects of temperature changes of the second temperature detector 7 caused by on/off of the rotary blade 4 can be ignored.

Thus, according to the embodiment, while the rotary blade 4 is off, the steam generation is large and the temperature change of the steam temperature detector is large, but sine the temperature is measured always at the same timing of on/off period of the rotary blade 4, the quantity of steam generation can be ignored. In this embodiment, the rotary blade 4 is off, but it is the same when it is on.

The eleventh embodiment of the invention is described below. The control means 26 in FIG. 8 is designed to operate the heater 16 for a specific time after start of processing. The other constitution is same as in the eighth embodiment.

Figure 13:
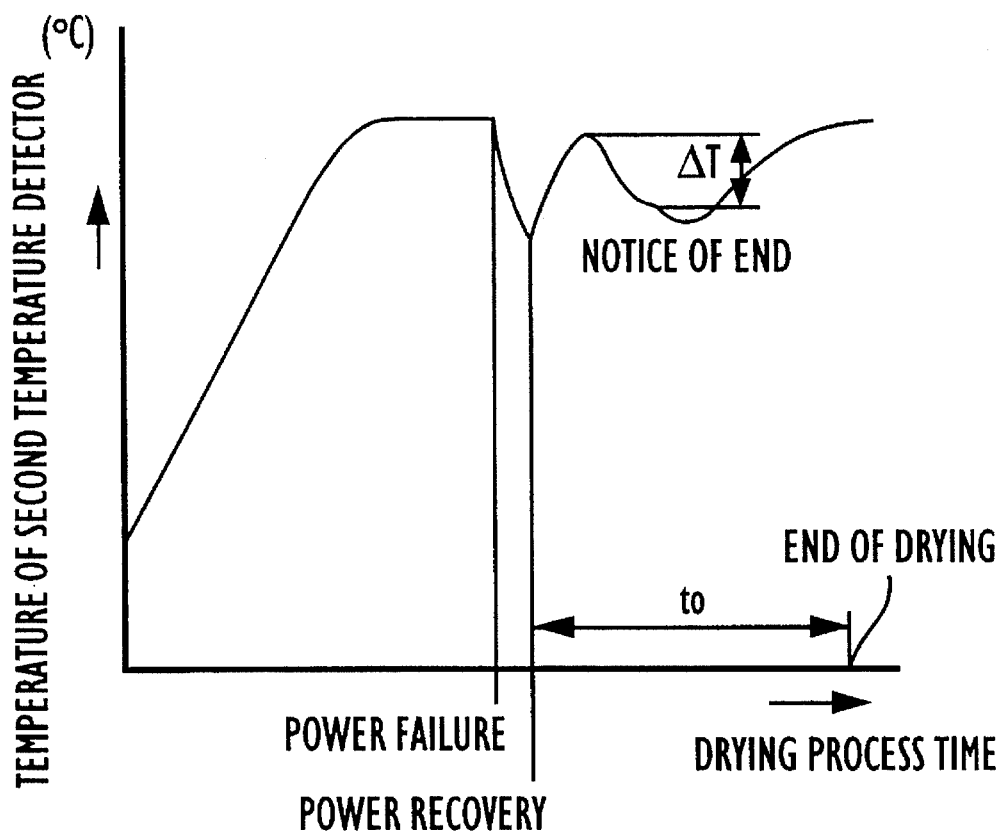
FIG. 13 is a diagram showing the drying process of a refuse treating apparatus in an eleventh embodiment of the invention.

In this constitution, explaining the operation while referring to FIG. 13, if power failure occurs in the drying process as shown in the drawing, the temperature of the second temperature detector 7 drops during the power failure. After the power recovery, the temperature of the second temperature detector 7 is raised by heating of the heater 16. However, since the steam generated from the refuse 21 is slow, the temperature of the second temperature detector 7 once going up soon begins to decline, and the specified amount ΔT varies to detect the end earlier. Accordingly, for a specific time t0 after start of drying process until steam is generated, drying process is carried out and then the end is detected, so that earlier detection can be prevented, and the end is not detected by mistake, thereby detecting the drying end time accurately without allowing to scorch.

Figure 14:
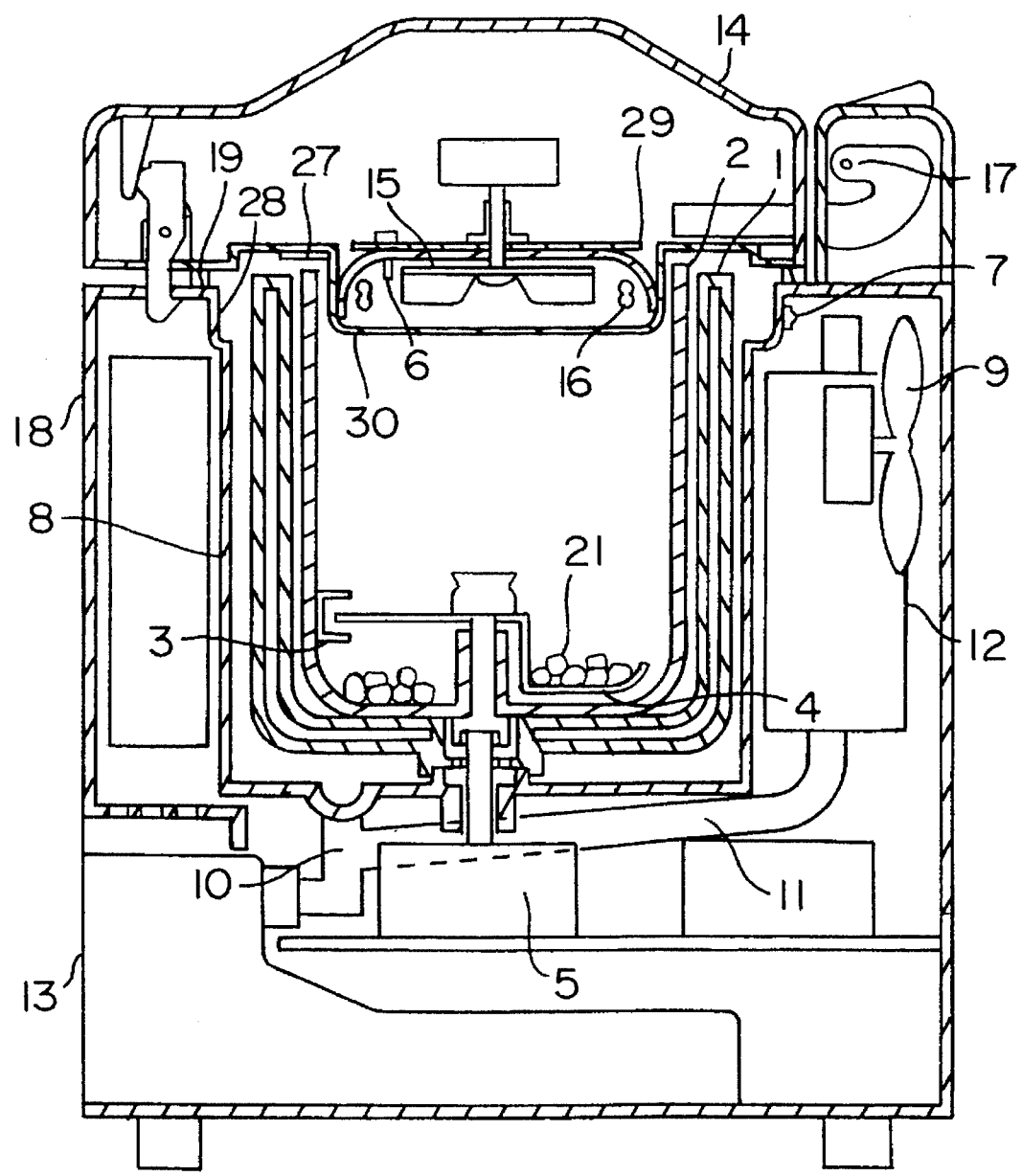
FIG. 14 is a sectional view of a refuse treating apparatus in a twelfth embodiment of the invention.
Figure 15:
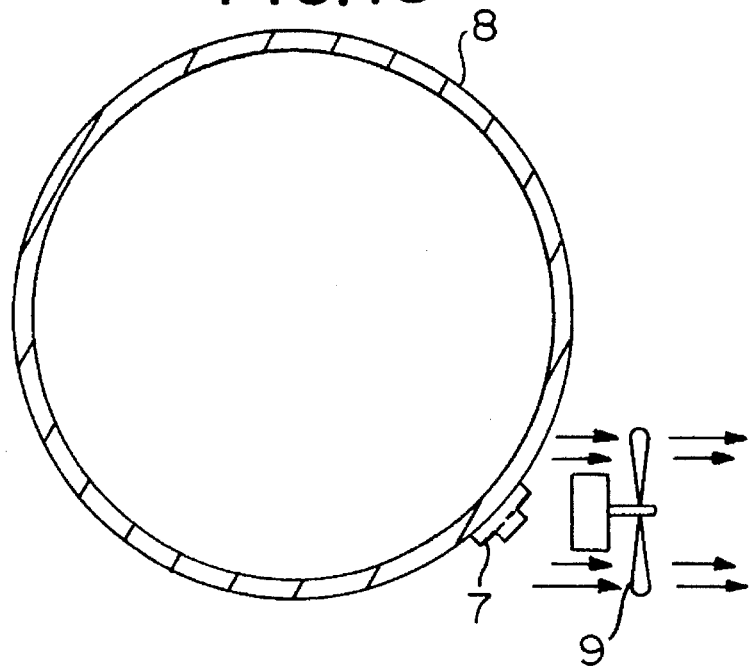
FIG. 15 is a sectional view of the refuse treating apparatus.
Figure 16:
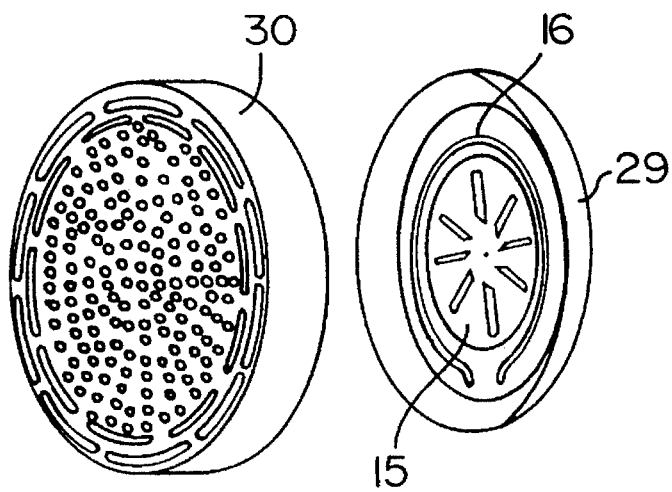
FIG. 16 is a perspective exploded view of heating means of the refuse treating apparatus.

The twelfth embodiment of the invention is described while referring to FIG. 14 to FIG. 16. The same parts as in the first embodiment are identified with same reference numerals and their explanations are omitted.

As shown in the drawings, the insulated container 1, upper end of the refuse container 2, and the lower surface of the lid 14 are disposed across a specific gap 27, and a steam passage of the steam generated from the refuse 21 flowing out from the refuse container 2 into the condenser 8 is formed.

The upper part of the condenser 8 is formed in two stages, and the inside diameter of the upper stage is set larger than the lower stage to form a steam reservoir 28, and on the outer wall of the steam reservoir 28 and on the outer wall of the condenser 8 confronting the cooling fan 9 as shown in FIG. 15, a second temperature detector 7 is attached. Besides, as shown in FIG. 16, an air guide 29 is provided in the rear part of the agitation fan 15, and the air guide 29 functions effectively for blowing out the hot air by the agitation fan 15 and heater 16 in the forward direction, and a fan cover 30 prevents the hot air from escaping by a short cut through the gap 27 between the refuse container 2 and the lower surface of the lid 14, so as to be supplied effectively into the refuse 21.

Explaining the operation in this constitution, the refuse 21 charged into the refuse container 2 is stirred by the rotary blade 4, and is ground by the rotary blade 4 and stationary blade 3. The hot air by the agitation fan 15 and heater 16 circulates in the space formed by the lower surface of the lid 14, fan cover 30 and the refuse container 2, and the refuse 21 is heated while stirring the air in this space. The output of the heater 16 is controlled by the output of the first temperature detector 6 so that the ambient temperature in the refuse container 2 may be a specified temperature, and the drying process is continued while preventing scorching of the refuse 21.

Steam is generated from the heated refuse 21, and flows out into the condenser 8. By the function of the insulated container 1, the temperature of the condenser 8 is lower than inside the refuse container 2, and therefore the steam is condensed, and the condensate is collected in the condensate container 13. As approaching the end of drying, the generation of steam decreases, and the temperature of the second temperature detector 7 provided on the outer wall side of the condenser 8 declines. Therefore, by terminating the drying process when the temperature change of the second temperature detector 7 exceeds a specified value, the drying end time can be known accurately without allowing to scorch.

Thus, according to the embodiment, since there is a steam passage for the steam to flow out from the refuse container 2 into the condenser 8 is provided, the second temperature detector 7 is more sensible to the heat of steam, and the temperature change can be detected more accurately. Besides, since the upper end of the refuse container 2 and the lower surface of the lid 14 are disposed across a specific gap, and the steam passage for flowing out from the refuse container 2 to the condenser 8 is formed, the steam generated by the heated refuse passes through the steam passage having a specific gap against the upper end of the refuse container 2 and the lower surface of the lid 14, and flows out to the condenser 8. At this time, by setting the gap relatively narrow, and adjusting the input and output of steam between the refuse container 2 and condenser 8, temporary temperature changes of the second temperature detector 7 provided outside of the condenser 8 can be decreased, and the detection precision is stabilized, so that the drying end point can be detected accurately.

Moreover, the upper part of the condenser 8 is designed in two-stage structure with the inside diameter of the upper stage larger than that of the lower stage, and a second temperature detector 7 is attached to the outer wall of the upper stage, and therefore a steam reservoir 28 is formed as the inside diameter of the upper stage is larger than that of the lower stage, and by attaching the second temperature detector 7 to the outer wall of the steam reservoir 28, the steam temperature can be detected stably.

Besides, by mounting the second temperature detector 7 on the outer wall of the condenser 8 confronting the cooling fan 9, the temperature change value at the drying end point of the second temperature detector 7 may be set large, so that the end of drying can be detected accurately.

Figure 17:
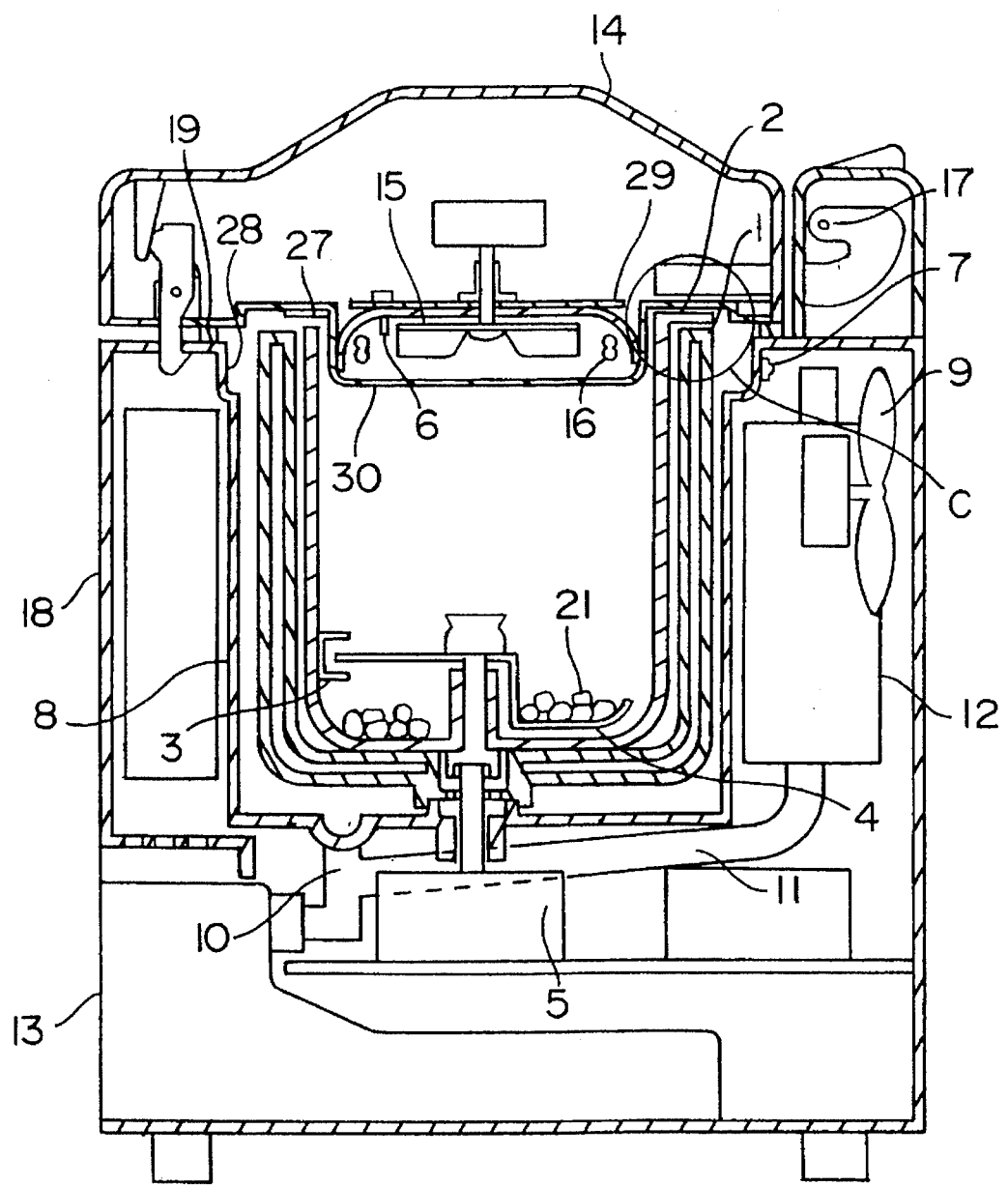
FIG. 17 is a sectional view of a refuse treating apparatus in a thirteenth embodiment of the invention.
Figure 18B:
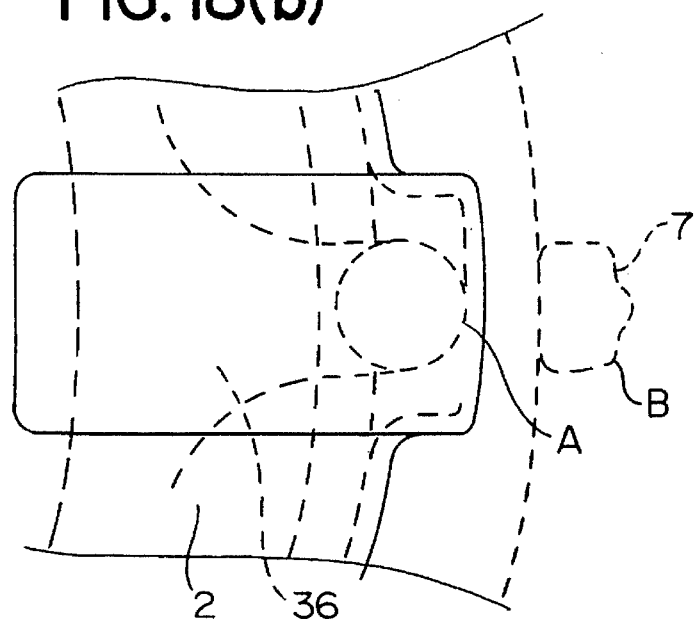
FIG. 18 (a) is a magnified sectional view of part C in FIG. 17, and FIG. 18 (b) is a magnified top view of part C in FIG. 17.
Figure 18A:
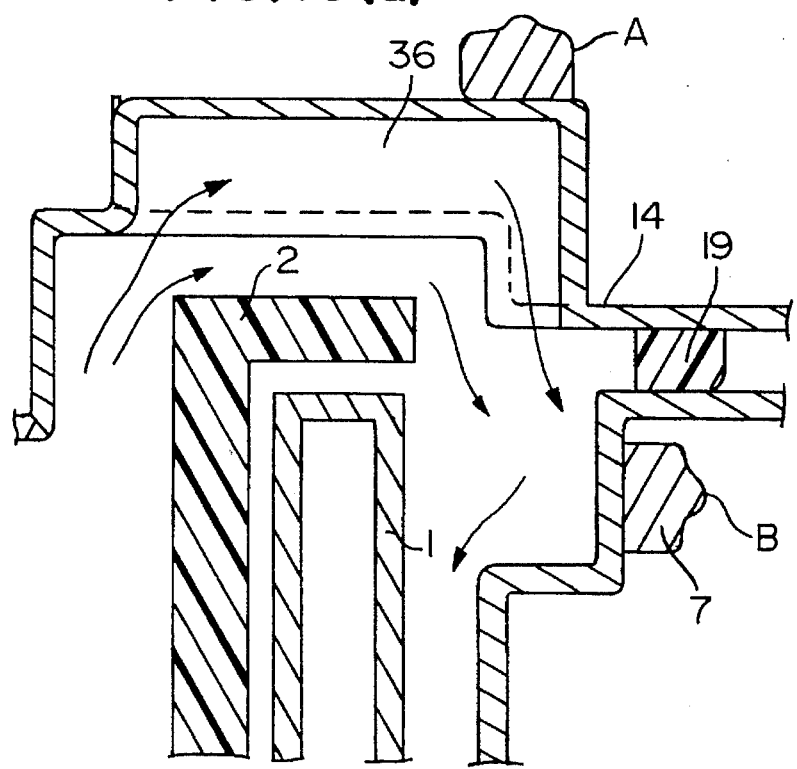

The thirteenth embodiment of the invention is described while referring to FIG. 17 and FIG. 18. The same parts as in the twelfth embodiment are identified with same reference numerals and their explanations are omitted.

As shown in the drawings, in the bottom of the lid 14, a recess 36 is formed in a part facing the steam passage from the upper end of the refuse container 2 to the condenser 8, and second temperature detecting means 7 is provided near (part A) the recess 36.

Explaining the operation in this embodiment, the steam generated from the refuse container 2 reaches the condenser 8 by passing through the steam passage formed by the whole circumference of the upper end of the refuse container 2 and the lid 14, but the sectional area of the steam passage is wider because the recess 36 is partly formed as compared with other parts than the recess 36. Accordingly, the steam generated from the refuse container 2 flows more into the recess 36 than in other parts. Therefore, as the drying of the refuse in the refuse container 2 is advanced and the steam volume decreases, the steam volume in the recess 36 decreases (changes) significantly.

Since the second temperature detecting means 7 is provided near the recess 36 where the steam volume changes significantly, decrease of steam volume, or the drying end point can be detected securely, so that highly precise drying control is realized.

In the embodiment, the second temperature detecting means 7 is provided inside the lid 14 and above the recess 36, but the same effects are obtained if provided above the condenser 8 in the position (part B) confronting the recess 36.

Figure 19:
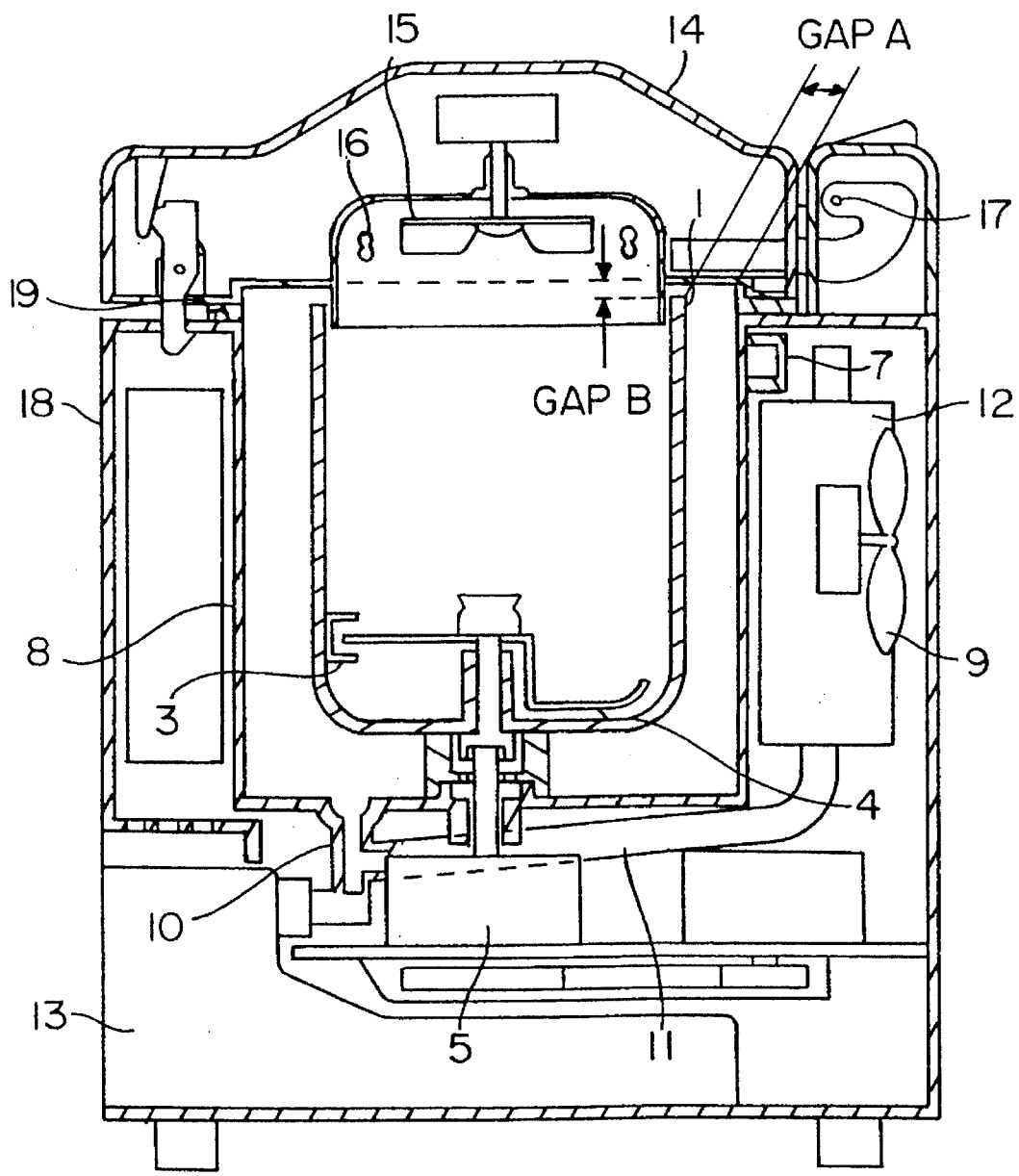
FIG. 19 is a sectional view of a refuse treating apparatus in a fourteenth embodiment of the invention.

The fourteenth embodiment of the invention is explained by reference to FIG. 19. The same parts as in the first embodiment are identified with same reference numerals and their explanations are omitted.

As shown in the drawing, the gap a formed by the refuse container 2 and the condenser 8 is set larger than the gap b formed between the upper end of the refuse container 2 and the inner surface of the lid 14.

Explaining the operation in the constitution, the refuse charged into the refuse container 2 is heated by the heater 16, and heat is diffused within the refuse container 2 by the agitation fan 15. The steam generated from the refuse passes through the gap b between the upper end of the refuse container 2 and the inner surface of the lid 14, and flows out to the condenser 8 at the outside of the refuse container 2. The steam is cooled and condensed in the condenser 8.

At this time, the gap a formed between the refuse container 2 and the condenser 8 is set larger than the gap b formed between the upper end of the refuse container 2 and inner surface of the lid 14, and therefore when the steam released from the refuse container 2 flows into the condenser 8, it is instantly expanded and diffused and the steam spreads in the condenser 8, and the temperature in the condenser 8 becomes uniform, so that the temperature detection precision by the second temperature detector 7 may be heightened.

Thus, according to the embodiment, by setting the gap a of the refuse container 2 and condenser 8 larger than the gap b of the refuse container 2 and lid 14, the generated steam massively spreads in the condenser 8, and the temperature detection precision by the second temperature detector 7 can be enhanced, so that drying process can be terminated precisely.

In the embodiment, insulated container is not provided, but it may be also provided outside of the refuse container 2 same as in the first embodiment.

In the foregoing embodiments, the second temperature detector 7 is provided oil the outer wall of the condenser 8, but it may be placed in any position where the temperature of the steam generated from the refuse in the refuse container 2 can be detected, for example, inward of the lid packing 19 on the inner surface of the lid 14.

Figure 20:
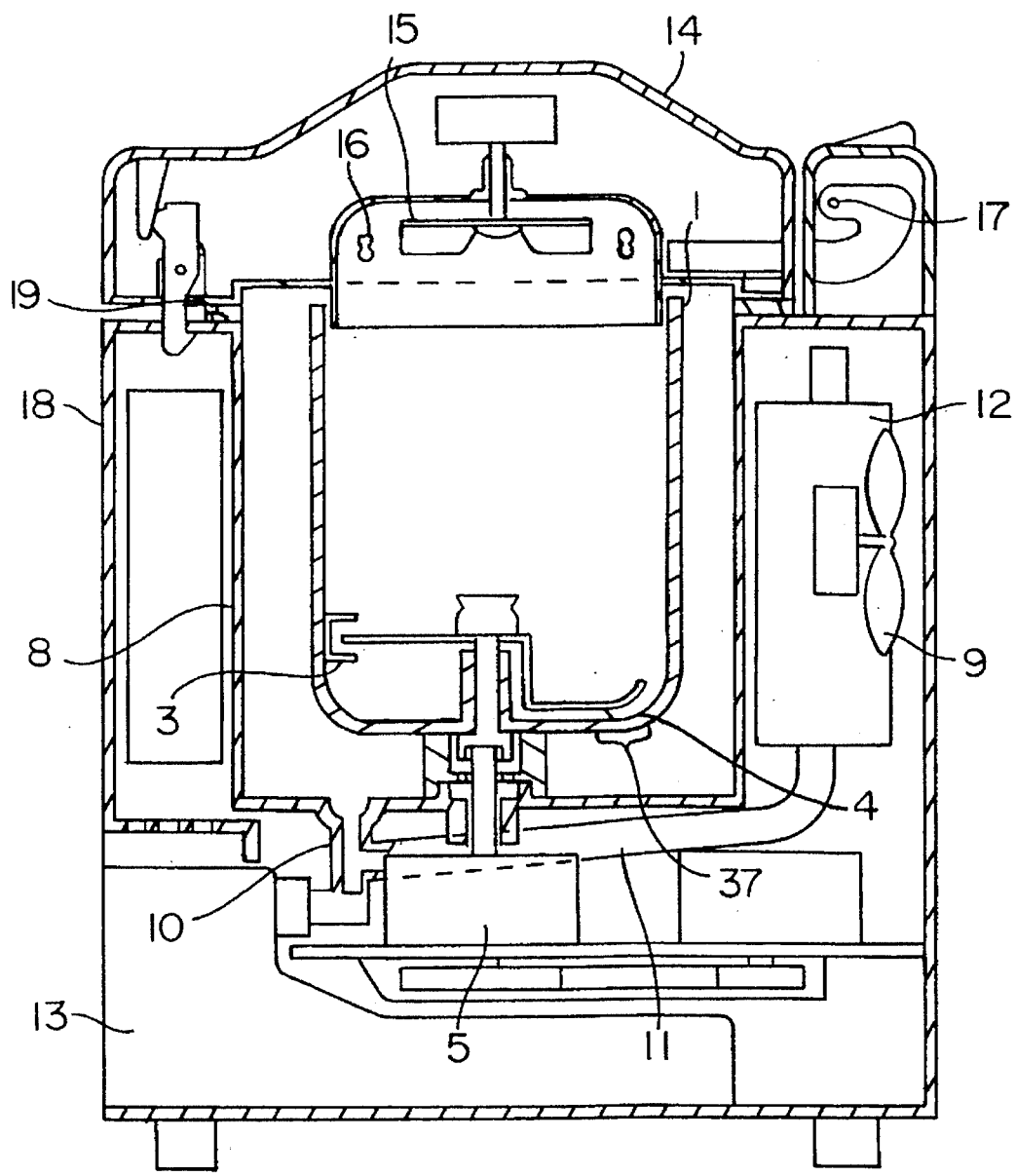
FIG. 20 is a sectional view of a refuse treating apparatus in a fifteenth embodiment of the invention.

The fifteenth embodiment of the invention is described below while referring to FIG. 20. The same parts as in the fourteenth embodiment are identified with same reference numerals and their explanations are omitted.

As shown in the drawing, a third temperature detector (third temperature detecting means) 37 is mounted on the lower outer wall of the refuse container 2, and the refuse temperature is detected. When the change of temperature detected by the third temperature detector 37 exceeds a specific value, drying process is terminated.

Figure 21:
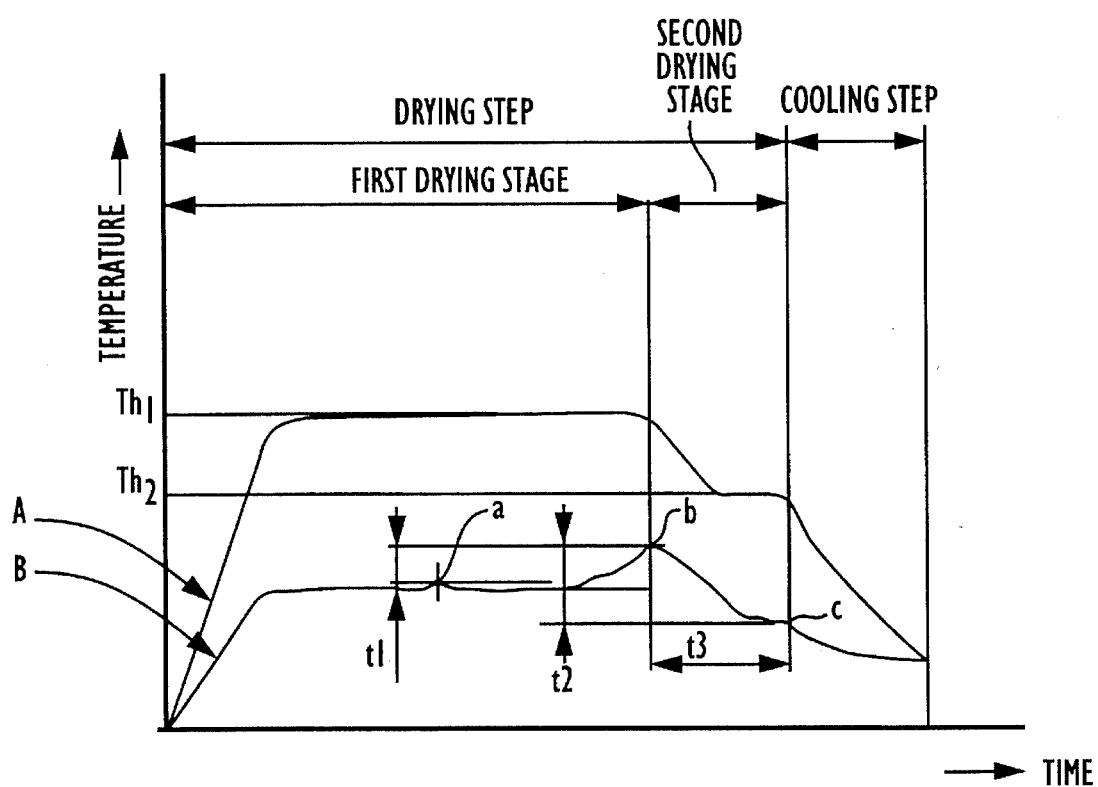
FIG. 21 is a diagram showing the relation of temperature and time of parts during operation of the refuse treating apparatus.

In the constitution, explaining the operation while referring to FIG. 21, which shows an entire process, consisting of a drying step comprising a first drying stage and a second drying stage, and a cooling step.

In FIG. 21, solid line A denotes the temperature transition in the refuse container 2 detected by the first temperature detector 6, and solid line B indicates the temperature transition of the refuse detected by the third temperature detector 37 attached to the lower outer wall of the refuse container 2.

In the first drying stage, once the temperature in the refuse container 2 reaches Th1 (about 130° C.), thereafter the heating is controlled to keep the temperature while monitoring the temperature by the first temperature detector 6. In this first drying stage, while the refuse contains much moisture, the refuse is deprived of heat to vaporization heat, and the temperature detected by the third temperature detector 37 does not exceed 100° C., but as the drying is advanced and the moisture in the refuse decreases, it climbs up gradually as indicated by solid line B.

In the first drying stage, when the refuse temperature is raised (point b) by a specific temperature t1 from the maximum point (point a), the first drying stage is terminated, and the second drying stage is started. In the second drying stage, heating control is continued while keeping the temperature in the refuse container 2 at Th2, lower than Th1 (for example, at 90° C.).

In the second drying stage, when passing a specific time t3 from point b, or when lowered (point c) by specific temperature t2 from the maximum temperature point (point b) detected by the third temperature detector 37, the second drying stage is terminated, and the final cooling step begins, that is, the heating control is turned off.

Thus, according to the embodiment, by detecting the refuse temperature by the third temperature detector (third temperature detecting means) 37, when the change of temperature detected by the third temperature detector 37 exceeds a specific value, drying process is terminated, and therefore the progress of drying of refuse is understood accurately, and the drying process is carried out efficiently without abnormally heating the refuse.

What is claimed is:

1. A refuse treating apparatus comprising, a refuse container, heating means for heating and drying the refuse in the refuse container, a condenser for condensing the steam generated from the refuse, first temperature detecting means for detecting the temperature near the refuse container, and second temperature detecting means for detecting the temperature of the steam flowing out from the refuse container into the condenser, wherein the output of the heating means is controlled by the first temperature detecting means to maintain the temperature near the refuse container at a predetermined temperature, and by the second temperature detecting means to terminate the drying process when the temperature detected by the second temperature detecting means exceeds a predetermined temperature.

2. A refuse treating apparatus of claim 1, wherein the first temperature detecting means is positioned in the lid provided above the refuse container to detect the temperature near the refuse container.

3. A refuse treating apparatus of claim 1, wherein the temperature detecting means terminates the drying process when the temperature detected by the second temperature detecting means is lowered by a predetermined amount from a maximum temperature.

4. A refuse treating apparatus of claim 1, wherein the second temperature detecting means terminates the drying process when the temperature detected by the second temperature detecting means reaches a predetermined temperature corrected for ambient temperature.

5. A refuse treating apparatus of claim 1, wherein the second temperature detecting means terminates the drying process when the temperature detected by the second temperature detecting means keeps below a predetermined temperature within a predetermined value for a predetermined time.

6. A refuse treating apparatus of claim 1, wherein the second temperature detecting means terminates the heating means when the temperature of the second temperature detecting means is lowered more than a set value from a maximum temperature, the maximum temperature being updated after the start of the temperature detection by the second temperature detecting means.

7. A refuse treating apparatus of claim 1, wherein said refuse container includes a rotary blade for stirring the refuse, said rotary blade being turned on/off, and said second temperature detecting means measuring the temperature at the same time as the on or off period of the rotary blade.

8. A refuse treating apparatus comprising:

a refuse container;

heating means for heating and drying the refuse in the refuse container;

a condenser for condensing the steam generated form the refuse;

first temperature detecting means for detecting the temperature near the refuse container; and second temperature detecting means for detecting the temperature of the steam flowing out from the refuse container into the condenser, wherein the output of the heating means is controlled by the first temperature detecting means to maintain the temperature near the refuse container at a predetermined temperature, and by the second temperature detecting means to terminate the drying process when the temperature change detected by the second temperature detecting means exceeds a predetermined temperature.

* * * * *